Patented Jan. 12, 1943

2,308,229

UNITED STATES PATENT OFFICE 2,308,229

PROCESS FOR THE MANUFACTURE OF STYRENE

Giulio Natta, Milan, Italy; vested in the Alien Property Custodian

No Drawing. Application June 12, 1940, Serial No. 340,226. In Italy July 8, 1939

8 Claims. (Cl. 260—669)

This invention relates to the manufacture of styrene which is employed in the preparation of polymers for the manufacture of synthetic resins and products of mixed polymerisation with diolefines, and the manufacture of some types of synthetic rubber.

Styrene is usually manufactured by dehydrogenation of ethylbenzene or by dissociation of chlorinated derivatives of ethylbenzene or by both these methods, the dehydrogenation being carried out in the presence of chlorine or chlorine containing compounds.

Direct dehydrogenation, effected in the presence of dehydrogenating catalysts shows the advantage of avoiding the use of chlorine which renders unavailable the hydrogen resulting as a by-product of dehydrogenation and corrodes metallic apparatus.

However the yield obtained by the simple dehydrogenation is very low (about 30% at 650° to 700° C.) for the reason that the chemical equilibrium which may be attained at said temperatures and ordinary pressure, corresponds to only a partial dehydrogenation of ethylbenzene.

Slightly higher yield is obtained by diluting the vapours of ethylbenzene with water or carbon dioxide.

It has now been found that by adding small quantities of air to vapours of water and of ethylbenzene, it becomes possible to partially burn the hydrogen formed during the dehydrogenation process without decomposing the styrene. In thus operating the chemical equilibrium is displaced towards a greater output of styrene which counterbalances, totally or partially, the greater expense of heating during the endothermic process.

Higher temperature allows the obtaining of products richer in styrene but the yields are lower owing to the formation of products of decomposition a portion of which are in the gaseous state.

The fact that during the catalytic dehydrogenation at 650 to 700° C. only a portion of the ethylbenzene under treatment is transformed does not represent a serious loss provided the styrene can be readily and completely separated from ethylbenzene and the latter is returned to the cycle for its dehydrogenation to styrene.

Practically however, remarkable difficulties were met in the separation of ethylbenzene from styrene, as the boiling point of the two components closely approach one another (136° and 143° C.) and further owing to the ease with which the styrene becomes polymerized.

Also distillation at reduced pressure does not offer quite satisfactory results when carried out on an industrial scale and does not completely prevent the formation of polystyrenes, even in the presence of negative catalysts of polymerisation.

This invention provides in a simple and complete manner the separation of ethylbenzene from styrene by carrying out a rectification in the presence of water. In said case the temperature at the end of the rectification column lies between the boiling temperatures of the azeotropic mixture water-ethylbenzene and water-styrene i. e. practically between 89° C. and 93° C.

Under such conditions the separation of the two azeotropic mixtures is effected in a complete way independently from the polymerisation of styrene as the latter is not heated through hot metallic walls but by means of direct steam or through the water contained in the vessel at the bottom of the rectification column. To said water may be added a small quantity of a substance which behave as negative catalysts for the polymerisation, for example, a naphthene, a slightly volatile phenol, etc.

The steam consumption in the rectifying operation is lower, according to the proportion in terms of water volume within the azeotropic mixtures.

The water reflux in the column may be less than that which would correspond to the composition of the azeotropic mixture as it has been observed that the separation takes place well even with a small reflux of water, provided that the reflux of ethylbenzene in the column be sufficient.

Further, it has been found convenient to completely separate water from ethylbenzene condensed by the condenser in the head of the column and convey to the column only a portion of ethylbenzene. Operating in this way the plates of the rectification column remain filled with mixtures of ethylbenzene and styrene and only small quantities of liquid water remain in the plates of the rectification apparatus.

The mentioned process of rectification may be intermittent or continuous. In the former case the distillation of the azeotropic ethylbenzene water mixture is first carried out and thereafter the distillation of the azeotropic styrene water mixture. By a simple decantation the hydrocarbons are separated from water.

If the rectification is carried out in a continuous manner the azeotropic ethylbenzene water mixture is separated at the top of the column while at the bottom of same the styrene is separated by decantation.

In order to obtain highly purified styrene it is convenient to distill the styrene obtained from the first column, even in the presence of water, within a second continuous column at the bottom of which the heaviest foreign matters are separated while purified styrene is separated at the top of the column or better at a certain height of same. In the second case the products issuing from the head or top of the second column are conveyed to the first column.

In the process of continuous distillation the styrene is separated in a liquid phase at the bottom of the column.

When starting with impure mixtures for less volatile solvents it may be convenient to withdraw the styrene in vapour phase from a gas outlet located between two lower plates of the column.

It is useful to maintain as low as possible the temperature in the vessel and therefore it may be convenient to work at a reduced pressure, notwithstanding that by working at ordinary pressure the polymerization be practically unattainable. When working at ordinary pressure it may be convenient to reduce to a minimum the difference of pressure between the bottom and the top of the column, which may be obtained by making use of special fillings in the rectification column or, when columns containing plates are used, by maintaining a small height of the liquid column above the gurgling apertures in any single plate.

When recourse is made to the above processes it is possible to completely separate ethylbenzene from styrene without fear that styrene may polmerize during the rectification.

What I claim is:

1. A process for the manufacture of styrene comprising dehydrogenating ethylbenzene with formation of a mixture of azeotropes of ethylbenzene and styrene, rectifying said mixtures with sufficient water to maintain a control temperature at which the azeotropes will separate, and separating the styrene from the ethylbenzene.

2. A process for the manufacture of styrene comprising dehydrogenating ethylbenzene with formation of a mixture of azeotropes of ethylbenzene and styrene, rectifying said mixtures in a rectifying column with sufficient water to maintain a control temperature at which the azeotropes will separate, withdrawing ethylbenzene azeotrope from the top of the rectifying column and returning the ethylbenzene to the dehydrogenation step, and removing the styrene azeotrope from the bottom of the column.

3. A process according to claim 2 including the step of maintaining a minimum pressure difference between the top and bottom of the rectifying column.

4. A process according to claim 1 in which the water is utilized as a vehicle for heat to distill the mixture of ethylbenzene-styrene azeotropes.

5. A process according to claim 2 in which the rectification is performed with reflux and only a portion of the ethylbenzene azeotrope at least partially deprived of the water accompanying it during rectification is returned to the rectification column.

6. A process according to claim 1 in which the rectification is carried out at a pressure below the atmosphere.

7. A process according to claim 1 in which the rectification is carried out in a continuous manner by feeding, at a given height, at least one rectification column with a mixture of ethylbenzene and styrene and withdrawing from the top of the column the fractions enriched with ethylbenzene while the fractions enriched with styrene are removed from the bottom.

8. A process according to claim 2 in which the rectification is carried out in a continuous manner by feeding, at a given height, at least one rectification column with a mixture of ethylbenzene and styrene and withdrawing from the top of the column the fractions enriched with ethylbenzene while the fractions enriched with styrene are removed from the bottom, the styrene being withdrawn in vapour phase from an outlet at the bottom of the rectification column.

GIULIO NATTA.